UNITED STATES PATENT OFFICE.

LEO WALLERSTEIN, OF NEW YORK, N. Y.

PREPARATION FOR USE IN BREWING.

995,823. Specification of Letters Patent. Patented June 20, 1911.

No Drawing. Application filed February 17, 1911. Serial No. 609,234.

*To all whom it may concern:*

Be it known that I, LEO WALLERSTEIN, a subject of the Emperor of Germany, residing at New York, in the county of New York and State of New York, have invented certain new and useful Improvements in Preparations for Use in Brewing, of which the following is a specification.

This invention relates to the art of brewing, and comprises a composition of matter to be added to beers, ales or like products for the purpose of rendering them more stable and otherwise improving their character.

In my copending application Ser. No. 554,645, filed April 11, 1910, I have described the addition to beers, ales or similar products, of proteolytic enzyms for the purpose of increasing their stability. As therein described, there is added to the beer at any suitable period of the brewing, but preferably during storage, a relatively small proportion of a suitable proteolytic enzym which is active or capable of activity in slightly acid media, examples of such enzyms being pepsin, bromelin, papain, enzyms derived from malt, and the like. The effect of such addition is to bring about, during and after the process of pasteurization, or even at lower temperatures, sufficient time being afforded, a modification or decomposition of the coagulable albuminoids of the beer, the change induced therein being, as I have discovered, of such character that these albuminoids are rendered far less sensitive to reduction of temperature and to the conditions of transportation, storage, etc. It is now regarded as probable that the action of the enzyms is to decompose the coagulable albuminoids with the formation of proteid bodies of simpler constitution and less sensitive character. I have now found that further improved results are obtained by using in conjunction with such enzyms or their commercial preparations a substance which is capable of acting as a protective colloid, or which is capable in some other manner of still further reducing the sensitiveness of the unchanged albuminoids of the beer or of the products of proteolysis. As such protective colloid I prefer to use water-soluble lupulin in admixture with a suitable sugar, as cane sugar. Such water-soluble lupulin may be prepared as described in my copending application Ser. No. 575,134, filed August 2, 1910.

In order that the invention may be fully understood I will describe a specific example thereof. Commercial lupulin or hop flour is mixed with a suitable excess of pulverized cane sugar, and the mixture charged into a porcelain ball-mill and subjected therein to prolonged grinding. Continuous grinding for about one week gives satisfactory results. For the best results excessive temperatures should be avoided, and it is preferable to cool the mixture, particularly in hot weather. Suitable proportions for the mixture to be ground are 2–10 parts by weight of commercial lupulin to 98–90 parts of cane sugar, the larger proportion of lupulin being preferred in order to reduce the quantity of the mixture to be treated. Proportions of lupulin greatly exceeding 10% by weight of the mixture cannot be satisfactorily treated by this method, as a sufficient degree of subdivision to yield the results desired is not obtainable. At the end of the milling operation the material will be found in a state of extreme subdivision, and to be capable of yielding yellow solutions even with cold water. The product obtained as above is then intimately mixed with a preparation containing a proteolytic enzym of the character above described, and if desired with an additional proportion of finely pulverized sugar. Suitable proportions for the final mixture may comprise: cane sugar, 42 parts; lupulin, 2 parts; commercial preparation of papain, 1 part. Similar proportions of the other enzym preparations described will be found suitable.

Of the above mixture, approximately one pound may be used for every ten barrels (310 gallons) of beer, this quantity being subject to some variation according to the proportion of coagulable albuminoids in the beer and other conditions. It is preferably added to the beer during storage and before filtration. Under these conditions the enzym becomes active during the pasteurization which follows the bottling, and as above described by its action so modifies the proteids that the beer will retain its brilliance when chilled, stored, transported or subjected to other adverse conditions.

As regards the advantages of this treatment, it is to be understood that certain valuable qualities of beers and ales, including their body, foam-keeping qualities and nutritive character, are largely dependent on the content of albuminoids. On the other hand, these albuminoids by reason of their tendency to coagulation, render the beer extremely sensitive and liable to cloud, particularly when chilled. Furthermore, in proportion as the albuminoids become coagulated the flavor of the beer tends to deteriorate. Heretofore efforts to impart stability to bottled beers and to improve their keeping qualities have usually depended upon the elimination of the albuminoids or upon a reduction of the percentage of albuminoids. According to the present method, on the other hand, there is little or no reduction of the proteid content of the beer, or loss of desirable qualities due to the presence of the proteids. There is merely such modification of the proteids as serves to eliminate their objectionable and characteristic tendency to coagulate. It is to be noted also that the enzym and the protective colloid coöperate in bringing about this desirable result. The addition of the lupulin alone serves to some degree to stabilize the beer, in virtue of its protective action upon even the unmodified albuminoids; and similarly the enzym alone very markedly increases the stability of the beer and if used in sufficient proportions may entirely eliminate the coagulable albuminoids. A primary advantage of the conjoint use of the enzym and the protective colloid is that the beer is thereby rendered more stable than by the use of either agent alone, and this result may be secured with a smaller proportion of the enzym, and with a less profound modification of the proteids, than would be required in case the protective colloid were omitted.

It is important that beers treated by this process should be free from salts of the heavy metals, and particularly tin salts, as these are found to neutralize or inhibit the effect of the enzym.

The process as above described is applicable also to the treatment of ales and similar products.

I claim:—

1. A composition of matter for stabilizing beer or ale, containing a proteolytic enzym active in slightly acid media, and a protective colloid.

2. A composition of matter for stabilizing beer or ale, containing a proteolytic enzym active in slightly acid media, and water-soluble lupulin.

3. The method of stabilizing beer or ale, which consists in adding thereto, prior to bottling, a proteolytic enzym active in slightly acid media, and water-soluble lupulin.

In testimony whereof, I affix my signature in presence of two witnesses.

LEO WALLERSTEIN.

Witnesses:
C. P. TOWNSEND,
E. DANIELS.